Feb. 8, 1955           E. E. CRILE           2,701,655
LOADING AND UNLOADING DEVICE FOR TRUCKS
Filed Sept. 22, 1952           2 Sheets-Sheet 1
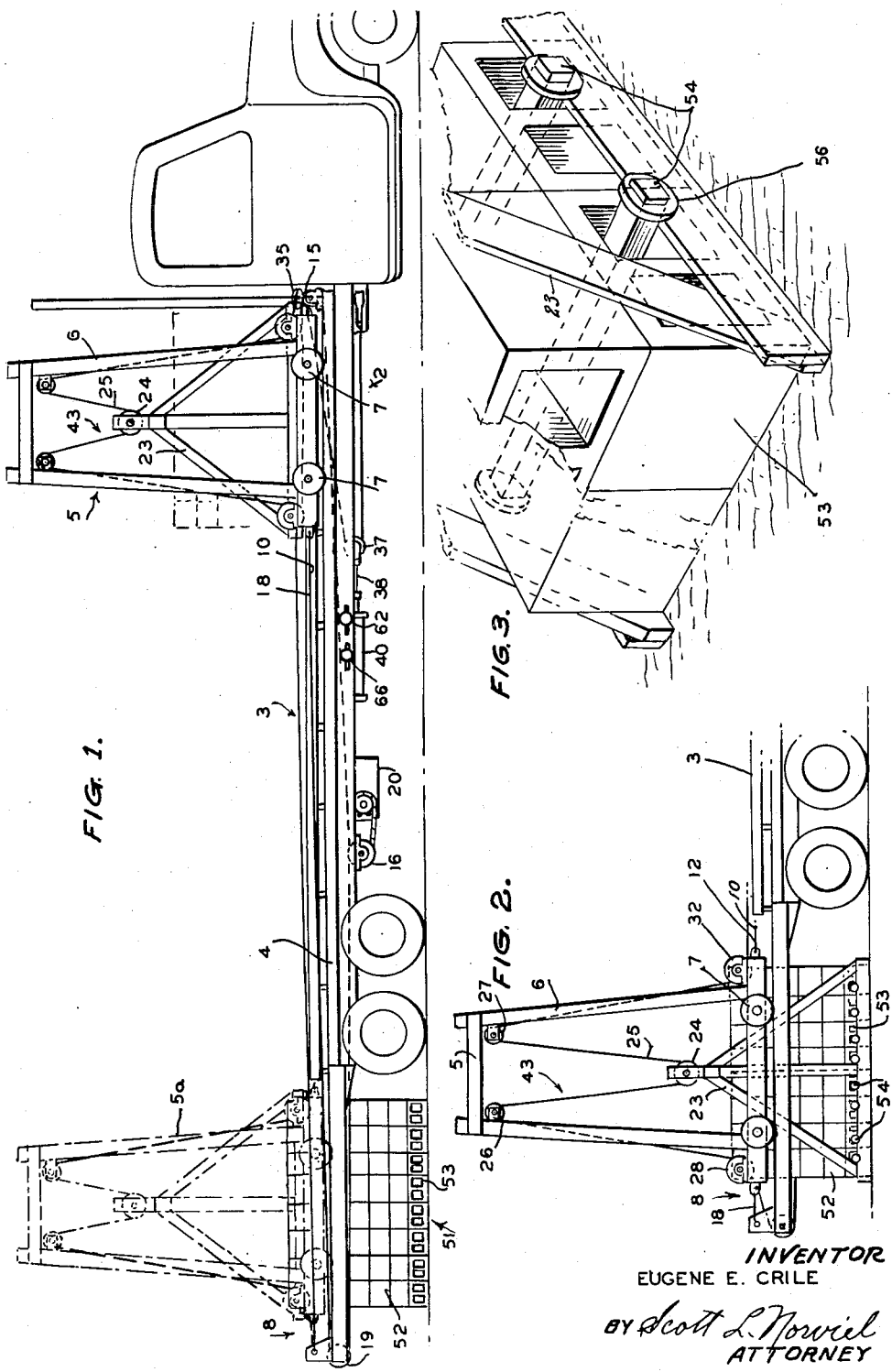
INVENTOR
EUGENE E. CRILE
BY Scott L. Norvell
ATTORNEY Feb. 8, 1955 E. E. CRILE 2,701,655
LOADING AND UNLOADING DEVICE FOR TRUCKS
Filed Sept. 22, 1952 2 Sheets-Sheet 2
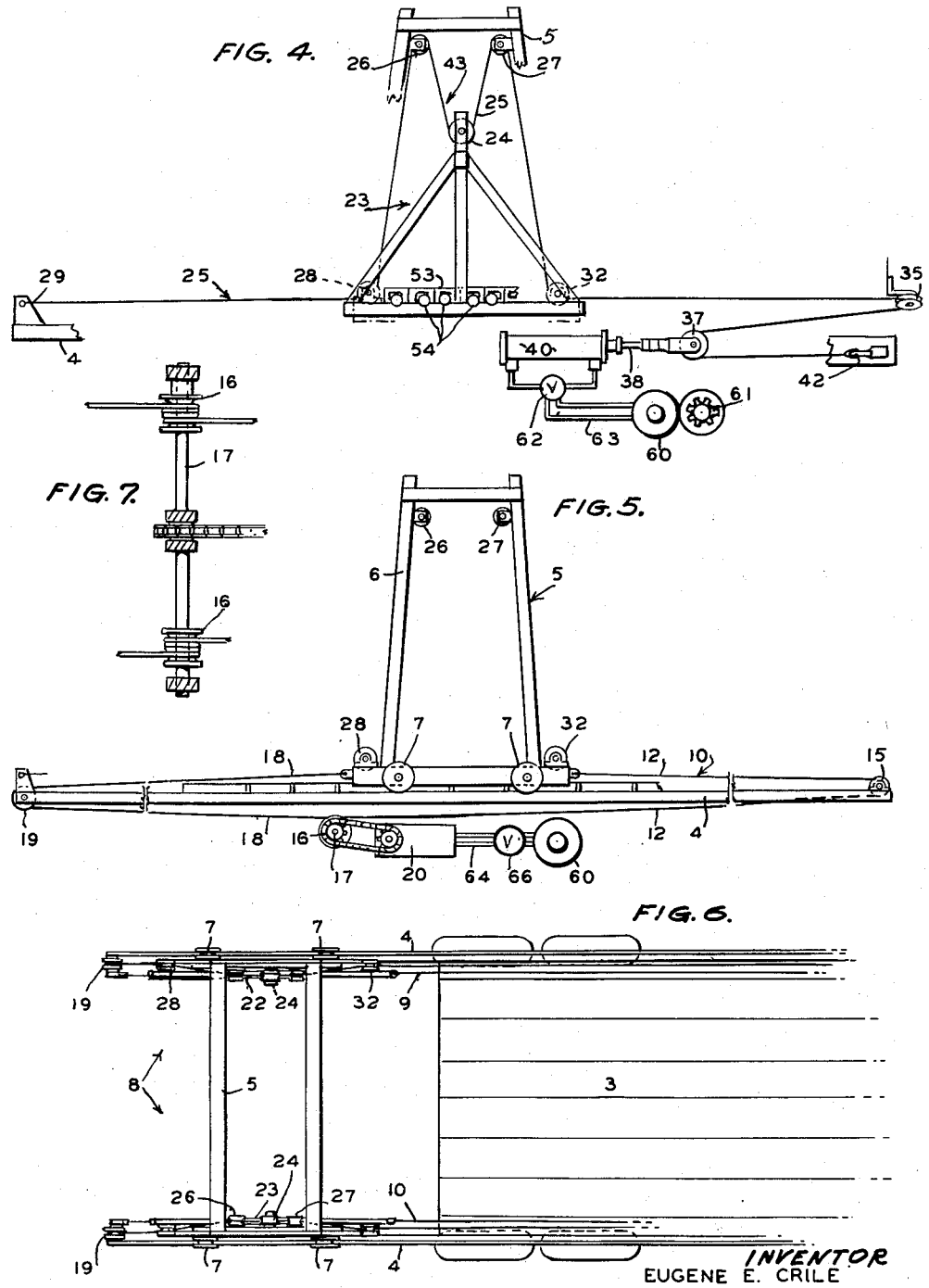
INVENTOR
EUGENE E. CRILE
BY Scott L Nowriel
ATTORNEY

United States Patent Office 2,701,655
Patented Feb. 8, 1955

2,701,655

LOADING AND UNLOADING DEVICE FOR TRUCKS

Eugene E. Crile, Phoenix, Ariz.

Application September 22, 1952, Serial No. 310,905

2 Claims. (Cl. 214—75)

This device concerns loading and unloading mechanism for trucks.

More particularly the devices, here disclosed, concern mechanism for loading and unloading rectangular stacks or "cubes" of rectangular shaped concrete building blocks of the type having ventilating openings extending through the body of the block.

One of the objects of the invention is to provide mechanism, which can be easily installed on the body of a flat bed truck, may be operated by oil under pressure furnished by a pump connected to the truck engine, and which will pick "cubes" of building blocks from the ground and place them at desired positions along the length of the truck bed, and, when desired will remove said "cubes" of blocks from the truck bed and deposit them on the ground at the rear of the truck.

Another object is to provide a loading and unloading mechanism, of the type above mentioned, which may be easily and cheaply made, and easily installed, and will operate without the need for extensive overhead trolleyways or hoists.

Still another object is to provide loading and unloading mechanism of the type above stated which will not interfere with the operating mechanism of the conventional type of truck, such as is now in common use, and will not interfere with the roadability of such a truck when installed.

Other objects will appear hereinafter.

I attain the foregoing objects by means of the mechanism, parts, and combination of parts shown in the accompanying drawings in which—

Figure 1 is a side elevation of my improved loading and unloading mechanism as installed on a flat bed truck;

Figure 2 is a side elevation of the rear portion of the truck with the loading and unloading carriage in the rear position and with a compactly stacked cube of building blocks in lowered position resting on the ground;

Figure 3 is an enlarged perspective view of a fragmentary portion of a stacked cube of blocks, showing means for securing the stack to the lifting mechanism;

Figure 4 is a semi-diagrammatic side elevational view showing details of the lowering and lifting mechanism of the loading carriage;

Figure 5 is a semi-diagrammatic side elevational view showing details of mechanism for longitudinal movement of the loading carriage on the truck bed;

Figure 6 is a plan view of the rear end portion of the truck with the loading carriage in the same position as in Figure 2; and Figure 7 is a plan view of the shaft and cable drums which provide longitudinal movement for the loading carriage.

Similar numerals indicate similar parts in the several views.

Referring to the accompanying drawings 2 indicates a truck of the flat bed type. The bed 3 of the truck body has inverted V-shaped rails 4 which extend along each side. A loading carriage 5 straddles the body and has side frame members 6 supported on wheels 7 which are grooved to run on rails 4. The loading carriage runs from the front end of the body to an overhanging portion 8, beyond the rear end of bed 3.

The longitudinal motion of this loading carriage is controlled by carriage control cables 9 and 10 on each side of the body, respectively. The forward portion 12 of each of these cables is attached to the forward bottom portion of each of the carriage side members 6. These cable portions then run over sheaves 15 supported on each side of the body at a position near the front end. After bending over these sheaves the under lay of each of these cable portions extends rearwardly beneath rail 4 on each side of the body and then winds around the drum 16 on its respective side of bed 3. The drums 16 are mounted on the ends of shaft 17, which is driven by oil motor 20. The rear part 18 of each of these cables is attached to the lower rear portion of each side of the frame of carriage 5 and extends rearwardly and bends over sheaves 19 and 21, respectively, at the rear end of each side rail. Each cable part then extends forward under the rails 4 and is wound around the drum 16 on its side in a position so as not to conflict with the winding of the forward portion. The windings are wound directionally so that, as the drum rotates in one direction, the forward portions 12 of each cable are drawn in and wound on the drum, and the rear portions 18 are unwound and payed out. Conversely as the drum is rotated in the opposite direction, the rear portion of the cable is wound onto the drum, and the forward portions are payed out.

Cables 9 and 10, being on each side of carriage 5 therefore, move it forward and rearward on rails 4, according to the direction of rotation of drums 16 which are, in turn, controlled by the direction of rotation of oil motor 20.

Adjacent the inner faces of side members 6 of carriage 5 there are left and right A frames 22 and 23. These frames are each supported on sheaves 24 at their apices under which left and right cables 25 run. These cables then run upward over sheaves 26 and 27 positioned, at the front and rear, respectively, in the top portion of each of the side frames 6 of carriage 5 forming bights 43, the extent of which is varied by varying the tension of the cables. These cables then run under sheaves 28 near the rear of the bottom portion of the sides 6 of carriage 5, and thence rearward above rails 4 to positions 29 near the rear end of the rails, where they are fastened. The forward portion of each of these cables runs over sheaves 35 at the front end of rails 4, after passing over sheaves 27 at the top of the carriage sides and under sheaves 32 on the bottom of these side members. The bottom lays of these cable portions then run under rails 4 rearward to sheaves 37 on the outer ends of piston rods 38 of hydraulic cylinders 40. The cables then extend forward and are attached at 42 to the forward end portion of the truck bed.

Raising and lowering of the A frames is controlled by hydraulic cylinders 40. When piston rods 38 carrying sheaves 37 are extended bights 43 in each of cables 25, between sheaves 26 and 27 are extended and loosened and sheaves 24 at the apices of A frames 22 and 23 are lowered. Drawing in these piston rods shortens the bights raises the sheaves 24 and consequently the A frames.

Each of the lifting cables 25 operates the same, and each is operated by a similar hydraulic piston and cylinder positioned on right and left sides, respectively, of the truck body. Oil pressure to these cylinders is controlled by valves 62 placed in oil pressure line 63.

The oil pressure pump is indicated by numeral 60, and is driven by power take off 61. It delivers oil under pressure to cylinder 40 through pipes 63, controlled by valve 62. The pipe circuit 64 supplies oil to oil motor 20 through reversing valve 66. These valves are most conveniently positioned along one side of the truck body, as shown.

In loading, the stacks are piled so that there is a row of blocks 53 at the bottom, positioned with their hollow spaces aligned transversely of the truck body. Through rods 54 are inserted through these openings and the ends of the rods secured to the longitudinal bars of the A frames. To secure the ends of through rods to these longitudinal bars, washers 56 are welded to the ends of the rods forming flanges which hook over their top edges.

After the stacks are in position below the rear overhanging part 8 of the truck body, through rods 54 are inserted through the openings in the bottom blocks, and their ends are attached, as above explained, to the bottom bars of the A frames, which have been lowered sufficiently to receive them.

At the start of this operation it is to be noted that the lifting frame carriage 5 is on the rear overhanging part of the truck. After the through rods are in place cables 25 are then tightened to shorten the bights 43 and the A frames are raised to the top of the truck bed. The lifting frame is then moved longitudinally forward by cables 9 and 10. When the carriage, carrying the stack of blocks, is over the forward end of truck bed the load is lowered onto the bed by cables 25. The through rods are then removed from the A frames and the lifting frame carriage returned to the rear end of the truck bed for another load.

Unloading is a converse operation. The rearmost stack of blocks is first removed by raising it from the bed and moving it rearward to the overhanging portion 8 and then lowering it to the ground. The truck is then moved forward to a position where the next load is to be placed, and the next stack raised from the truck bed, moved rearward, and lowered to the ground. This is continued until all stacks are unloaded.

I claim:

1. In a loading and unloading mechanism for a truck having a power driven oil pressure pump, and a flat bed, rails laterally disposed on said bed; a lifting carriage having an upwardly extending frame including side members with grooved wheels on the bottom of said side members running on said rails and sheaves disposed fore and aft on the top and bottom portions of said side members; means for moving said carriage fore and aft on said rails, including cable drums operating on a transverse shaft disposed on said truck bed, driven by an oil pressure motor connected, through control valves, to said power driven oil pressure pump; carriage control cables wound on said drums and connected to said lifting carriage to move it on said rails responsive to rotation of said cable drums; and means for raising and lowering loads within said carriage, including A frames having sheaves at their apices supported by variable bights in lifting cables running over sheaves in the upper parts of the side members of said lifting carriage, connected at their bottoms by removable through rods for insertion through stacks of building blocks; lifting cables running over said sheaves at the tops of the side members of said lifting carriage providing bights of variable extent controlled by the tension of said cables, and running thence under said sheaves at the bottoms of said side members to oil pressure operated piston rods; oil pressure cylinders operating said piston rods, controlled by oil pressure from said power driven pump and varying the extent of said bights by varying the tension on said lifting cables to raise and lower said A frames; said lifting carriage being free to move along said rails independently of the tension on said lifting cables.

2. In loading and unloading mechanism for a truck having a flat bed, in combination, longitudinally extending track rails laterally disposed on said bed and extending rearwardly on said bed to provide an overhanging loading and unloading portion; and a power driven oil pressure pump; a lifting carriage, travelling fore and aft over said truck bed, having side members with grooved wheels running fore and aft along said rails to and from said overhanging loading and unloading portion, cable sheaves disposed fore and aft on the top and on the bottom portions of each of said side members, load handling A frames having cable sheaves at their apices and longitudinally extending horizontal bars at their bottoms, laterally disposed within said lifting carriage adjacent the side members, load supporting transverse throughbars extending through transverse openings in a stack of blocks to be placed on said truck, supported at their ends on said horizontal bars at the bottoms of said A frames, and mechanism for supporting and raising and lowering each of said A frames and a load supported thereby including cables attached to the aft ends of each of said track rails on said truck, running thence along said rails to and under the said aft sheaves on the lower portions of said carriage side members, thence over said aft sheaves on the upper portion of the side members of said carriage, then downward under the said sheaves on said A frames and upward over the sheaves on the fore upper portion of said side members of said carriage forming variable supporting bights, and thence under the sheaves on the lower fore portion of said carriage and along the fore portion of said rails to the piston rod heads of hydraulic cylinders; means for supplying said hydraulic cylinders with oil under pressure from said oil pressure pump on said truck, and manual valve means for controlling said oil pressure.

References Cited in the file of this patent

UNITED STATES PATENTS

| | | |
|---|---|---|
| 1,943,398 | Sargent | Jan. 16, 1934 |
| 2,156,424 | Barnard | May 2, 1939 |
| 2,177,525 | Henderson | Oct. 24, 1939 |
| 2,339,360 | Sicard | Jan. 18, 1944 |
| 2,478,513 | Te Desco | Aug. 9, 1949 |
| 2,506,930 | Le Tourneau | May 9, 1950 |
| 2,557,253 | Belden | June 19, 1951 |
| 2,605,914 | Hala | Aug. 5, 1952 |
| 2,650,724 | Bill | Sept. 1, 1953 |
| 2,663,436 | Bowser | Dec. 22, 1953 |

FOREIGN PATENTS

| | | |
|---|---|---|
| 22,561 of 1929 | Australia | Aug. 8, 1930 |